United States Patent
Oyman

(10) Patent No.: US 10,165,226 B2
(45) Date of Patent: *Dec. 25, 2018

(54) INTERACTIVE VIDEO CONFERENCING

(71) Applicant: INTEL IP CORPORATION, Santa Clara, CA (US)

(72) Inventor: Ozgur Oyman, San Jose, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/710,589

(22) Filed: Sep. 20, 2017

(65) Prior Publication Data

US 2018/0013980 A1    Jan. 11, 2018

Related U.S. Application Data

(63) Continuation of application No. 15/180,510, filed on Jun. 13, 2016, now Pat. No. 9,794,515, which is a (Continued)

(51) Int. Cl.
*H04N 7/15* (2006.01)
*H04L 29/06* (2006.01)
(Continued)

(52) U.S. Cl.
CPC ........... *H04N 7/15* (2013.01); *H04L 65/1069* (2013.01); *H04L 65/1083* (2013.01);
(Continued)

(58) Field of Classification Search
CPC ................ H04L 65/80; H04N 5/23216; H04N 5/23222; H04N 7/15
(Continued)

(56) References Cited

U.S. PATENT DOCUMENTS 6,490,319 B1   12/2002 Yang et al.
6,496,607 B1   12/2002 Krishnamurthy et al.
(Continued)

FOREIGN PATENT DOCUMENTS

CN   101167365 A   4/2008
CN   101404726 A   4/2009
(Continued)

OTHER PUBLICATIONS

3GPP TS 26.114, "IP Multimedia Telephony; Media handling and interaction", Jun. 2011, 240 pages, Version 11.0.0, Release 11.
(Continued)

*Primary Examiner* — Gerald Gauthier
(74) *Attorney, Agent, or Firm* — Thorpe North & Western

(57) ABSTRACT

Technology for a first multimedia telephony services over internet protocol (IP) multimedia subsystems (IMS) (MTSI) client operable to support region of interest (ROI) signaling with a second MTSI client is disclosed. The first MTSI client can identify a requested region of interest (ROI). The first MTSI client can encode the requested ROI for transmission to the second MTSI client via a real-time transport control protocol (RTCP) feedback message. The first MTSI client can decode encoded video received from the second MTSI client that corresponds to the requested ROI.

21 Claims, 10 Drawing Sheets

Related U.S. Application Data continuation of application No. 14/582,376, filed on Dec. 24, 2014, now Pat. No. 9,386,275.

(60) Provisional application No. 61/924,194, filed on Jan. 6, 2014.

(51) Int. Cl.
*H04N 7/14* (2006.01)
*H04N 21/4728* (2011.01)
*H04N 21/63* (2011.01)
*H04N 21/6437* (2011.01)

(52) U.S. Cl.
CPC ........ *H04L 65/403* (2013.01); *H04L 65/4053* (2013.01); *H04L 65/607* (2013.01); *H04L 65/608* (2013.01); *H04L 65/80* (2013.01); *H04N 7/142* (2013.01); *H04N 7/147* (2013.01); *H04N 21/4728* (2013.01); *H04N 21/632* (2013.01); *H04N 21/6437* (2013.01); *H04N 2007/145* (2013.01)

(58) Field of Classification Search
USPC .......... 345/55, 428; 348/14.02, 14.08, 14.09, 348/36, 14.16; 370/237, 252; 375/240.08, 240.01, 240.12, 240.26; 707/723; 709/228, 230, 231; 725/25, 725/118; 386/280
See application file for complete search history.

(56) References Cited

U.S. PATENT DOCUMENTS

| | | | |
|---|---|---|---|
| 7,119,829 B2 | 10/2006 | Leonard et al. | |
| 7,321,384 B1 | 1/2008 | Wu et al. | |
| 7,559,026 B2 | 7/2009 | Girish et al. | |
| 8,019,170 B2 | 9/2011 | Wang et al. | |
| 8,150,155 B2 | 4/2012 | El-Maleh et al. | |
| 8,189,807 B2 | 5/2012 | Cutler | |
| 8,289,371 B2 | 10/2012 | Wagner et al. | |
| 8,315,466 B2 | 11/2012 | El-Maleh et al. | |
| 8,446,454 B2 | 5/2013 | Decker et al. | |
| 8,570,359 B2 | 10/2013 | Ali et al. | |
| 8,711,198 B2 | 4/2014 | Malzbender et al. | |
| 8,890,923 B2 | 11/2014 | Tian et al. | |
| 8,970,653 B2 | 3/2015 | Bowen et al. | |
| 9,088,694 B2 | 7/2015 | Navon et al. | |
| 9,125,073 B2 | 9/2015 | Oyman et al. | |
| 9,213,605 B2 | 12/2015 | Oyman | |
| 9,307,192 B2 | 4/2016 | Oyman | |
| 9,794,515 B2* | 10/2017 | Oyman | H04N 7/15 |
| 2003/0174202 A1 | 9/2003 | Eshkoli | |
| 2003/0236908 A1* | 12/2003 | Khang | H04B 7/18523 709/231 |
| 2005/0024484 A1 | 2/2005 | Leonard et al. | |
| 2005/0198338 A1* | 9/2005 | Chebil | H04L 29/06027 709/230 |
| 2006/0215752 A1 | 9/2006 | Lee et al. | |
| 2006/0215753 A1* | 9/2006 | Lee | H04N 7/147 375/240.08 |
| 2006/0215766 A1 | 9/2006 | Wang et al. | |
| 2006/0238445 A1* | 10/2006 | Wang | H04N 19/176 345/55 |
| 2006/0256851 A1* | 11/2006 | Wang | H04N 21/23432 375/240.01 |
| 2007/0076957 A1 | 4/2007 | Wang | |
| 2008/0095228 A1* | 4/2008 | Hannuksela | H04N 19/70 375/240.01 |
| 2008/0225944 A1 | 9/2008 | Pore et al. | |
| 2008/0291265 A1* | 11/2008 | Wagner | H04N 7/152 348/14.16 |
| 2010/0002071 A1* | 1/2010 | Ahiska | H04N 5/217 348/36 |
| 2010/0026781 A1* | 2/2010 | Ali | G06K 9/00234 348/14.08 |
| 2010/0103245 A1 | 4/2010 | Decker et al. | |
| 2010/0118111 A1 | 5/2010 | Bouazizi | |
| 2010/0132002 A1* | 5/2010 | Henocq | H03M 13/03 725/118 |
| 2010/0158135 A1* | 6/2010 | Yin | H04N 19/70 375/240.26 |
| 2011/0085016 A1 | 4/2011 | Kristiansen et al. | |
| 2011/0128288 A1* | 6/2011 | Petrou | G06F 17/30047 345/428 |
| 2011/0205333 A1 | 8/2011 | Wu et al. | |
| 2011/0249073 A1 | 10/2011 | Cranfill et al. | |
| 2011/0249074 A1 | 10/2011 | Cranfill et al. | |
| 2012/0320141 A1 | 12/2012 | Bowen et al. | |
| 2013/0101035 A1* | 4/2013 | Wang | H04N 19/70 375/240.12 |
| 2013/0142055 A1* | 6/2013 | Bao | H04W 36/0011 370/252 |
| 2013/0155182 A1 | 6/2013 | Bekiares et al. | |
| 2013/0202273 A1* | 8/2013 | Ouedraogo | H04N 9/79 386/280 |
| 2013/0234934 A1 | 9/2013 | Champion et al. | |
| 2013/0275615 A1 | 10/2013 | Oyman | |
| 2014/0046935 A1* | 2/2014 | Bengio | G06F 17/30277 707/723 |
| 2014/0078241 A1 | 3/2014 | Vaisburd et al. | |
| 2014/0079118 A1* | 3/2014 | Dedeoglu | H04N 19/46 375/240.08 |
| 2014/0079126 A1 | 3/2014 | Ye et al. | |
| 2014/0320587 A1 | 10/2014 | Oyman | |
| 2014/0359652 A1* | 12/2014 | Ghorbel | H04N 19/17 725/25 |
| 2015/0023407 A1 | 1/2015 | Sato | |
| 2015/0103927 A1* | 4/2015 | Hannuksela | H04N 19/119 375/240.26 |
| 2015/0180825 A1* | 6/2015 | Ren | H04L 61/2564 709/228 |
| 2015/0195490 A1* | 7/2015 | Oyman | H04L 65/608 348/14.02 |
| 2015/0326572 A1 | 11/2015 | Oyman | |
| 2015/0334157 A1 | 11/2015 | Oyman et al. | |
| 2016/0036704 A1* | 2/2016 | Xiao | H04L 47/2416 370/237 |
| 2016/0044099 A1 | 2/2016 | Oyman | |
| 2016/0100099 A1* | 4/2016 | Oyman | H04N 19/167 348/14.08 |
| 2016/0165185 A1* | 6/2016 | Oyman | H04N 19/167 348/14.08 |
| 2017/0111425 A1* | 4/2017 | Gell | H04L 65/80 |
| 2017/0332042 A1* | 11/2017 | Oyman | H04N 7/15 |
| 2018/0013980 A1* | 1/2018 | Oyman | H04L 65/607 |

FOREIGN PATENT DOCUMENTS

| | | |
|---|---|---|
| CN | 101453639 A | 6/2009 |
| CN | 101755454 A | 6/2010 |
| CN | 102648626 A | 8/2012 |
| EP | 2343879 A1 | 7/2011 |
| JP | 2002519915 A | 7/2002 |
| JP | 2008535423 A | 8/2008 |
| KR | 10-2009/0026781 A1 | 1/2009 |
| KR | 10-2009/0020421 A | 2/2009 |
| KR | 10-2013-0010003 A | 1/2013 |
| TW | 201303786 A | 1/2013 |
| WO | WO 2011/126511 A1 | 10/2011 |
| WO | WO 2014/176087 A1 | 10/2014 |

OTHER PUBLICATIONS

3GPP TS 26.140, "Multimedia Messaging Service (MMS); Media formats and codecs", Mar. 2012, 13 pages, Version 11.0.0 Release 11.

3GPP TS 26.244, "Transparent end-to-end packet switched streaming service (PSS); 3GPP file format (3GP)", Jun. 2012, 58 pages, Version 11.0.0, Release 11.

(56) References Cited

OTHER PUBLICATIONS

3GPP TS 26.247, "Transparent end-to-end Packet-switched Streaming Service (PSS); Progressive Download and Dynamic Adaptive Streaming over HTTP (3GP-DASH)", Sep. 2012, 112 pages, Version 11.0.0, Release 11.
3GPP TS 26.346, "Multimedia Broadcast/Multicast Service (MBMS); Protocols and codecs", Mar. 2012, 163 pages, Version 11.0.0, Release 11.
Extended European search report for European Application No. EP 15733222.2 / PCT/US2015010385 filed Jan. 6, 2015; date of completion of the search Jul. 4, 2017; 15 pages.
Intel, "ROI Permanent Document—Requirements, Working Assumptions and Potential Solutions", 3GPP TSG-SA4 S4-140975 (revision of S4-140820), Version 0.3, Agenda 11.7, Meeting 80, 5 pages, Aug. 2014, San Francisco, CA, USA.
Intel, "ROI Permanent Document—Requirements, Working Assumptions and Potential Solutions", 3GPP TSG-SA4 S4-150446, Version 1.1.0, Agenda 10.5.4, Meeting 83, 14 pages, Apr. 2015, Bratislava, Slovakia.
ITU-T H.282, "Remote device control protocol for multimedia applications", Series H: Audiovisual and Multimedia Systems, May 1999, 23 pages.
Ott et al, "Extended RTP Profile for Real-time Transport Control Protocol (RTCP)-Based Feedback (RTP/AVPF)", Network Working Group Request for Comments: 4585, Jul. 2006, 52 pages.
Polycom, "H.FEMC: Proposed updates", Telecommunication Standardization Sector COM 16-C 332 R1-E, Study Group 16—Contribution 332 R1, Oct. 2013, 97 pages.
Singer, "A General Mechanism for RTP Header Extensions", Network Working Group Request for Comments: 5285, Jul. 2008, 18 pages.

\* cited by examiner

SDP Offer

```
m=video 49154 RTP/AVP 99
a=tcap:1 RTP/AVPF
a=pcfg:1 t=1
b=AS:315
b=RS:0
b=RR:2500
a=rtpmap:99 H264/90000
a=fmtp:99 packetization-mode=0; profile-level-id=42e00c; \
      sprop-parameter-sets=J0LgDJWgUH6Af1A=,KM46gA==
a=imageattr:99 send [x=320,y=240] [x=240,y=320] recv [x=320,y=240]
[x=240,y=320]
a=rtcp-fb:* trr-int 5000
a=rtcp-fb:* nack
a=rtcp-fb:* nack pli
a=rtcp-fb:* ccm fir
a=rtcp-fb:* ccm tmmbr
a=rtcp-fb:* 3gpp-roi-zoom
a=extmap:4 urn:3gpp:roi-actual
```

FIG. 3A

SDP Answer

```
m=video 49154 RTP/AVPF 99
a=acfg:1 t=1
b=AS:315
b=RS:0
b=RR:2500
a=rtpmap:99 H264/90000
a=fmtp:99 packetization-mode=0; profile-level-id=42e00c; \
      sprop-parameter-sets=J0LgDJWgUH6Af1A=,KM46gA==
a=imageattr:99 send [x=320,y=240] [x=240,y=320] recv [x=320,y=240]
[x=240,y=320]
a=rtcp-fb:* trr-int 5000
a=rtcp-fb:* nack
a=rtcp-fb:* nack pli
a=rtcp-fb:* ccm fir
a=rtcp-fb:* ccm tmmbr
a=rtcp-fb:* 3gpp-roi-zoom
a=extmap:4 urn:3gpp:roi-actual
```

FIG. 3B

SDP Offer

```
m=video 49154 RTP/AVP 99
a=tcap:1 RTP/AVPF
a=pcfg:1 t=1
b=AS:315
b=RS:0
b=RR:2500
a=rtpmap:99 H264/90000
a=fmtp:99 packetization-mode=0; profile-level-id=42e00c; \
      sprop-parameter-sets=J0LgDJWgUH6Af1A=,KM46gA==
a=imageattr:99 send [x=320,y=240] [x=240,y=320] recv [x=320,y=240]
[x=240,y=320]
a=rtcp-fb:* trr-int 5000
a=rtcp-fb:* nack
a=rtcp-fb:* nack pli
a=rtcp-fb:* ccm fir
a=rtcp-fb:* ccm tmmbr
a=rtcp-fb:* 3gpp-roi-zoom
a=extmap:4 urn:3gpp:roi-actual
```

FIG. 4A

SDP Answer

```
m=video 49154 RTP/AVPF 99
a=acfg:1 t=1
b=AS:315
b=RS:0
b=RR:2500
a=rtpmap:99 H264/90000
a=fmtp:99 packetization-mode=0; profile-level-id=42e00c; \
      sprop-parameter-sets=J0LgDJWgUH6Af1A=,KM46gA==
a=imageattr:99 send [x=320,y=240] [x=240,y=320] recv [x=320,y=240]
[x=240,y=320]
a=rtcp-fb:* trr-int 5000
a=rtcp-fb:* nack
a=rtcp-fb:* nack pli
a=rtcp-fb:* ccm fir
a=rtcp-fb:* ccm tmmbr
a=rtcp-fb:* 3gpp-roi-zoom
```

FIG. 4B

INTERACTIVE VIDEO CONFERENCING

RELATED APPLICATIONS

This application is a continuation of U.S. patent application Ser. No. 15/180,510 filed Jun. 13, 2016, which is a continuation of U.S. patent application Ser. No. 14/582,376 filed Dec. 24, 2014, which claims the benefit of U.S. Provisional Patent Application No. 61/924,194, filed Jan. 6, 2014, the entire specification of which is hereby incorporated by reference in its entirety for all purposes.

BACKGROUND

The growth of multimedia services, including streaming and conversational services, is one of the key drivers of the evolution to new mobile broadband technologies and standards. Digital video content is increasingly consumed in mobile devices. There are many video applications extensively used on mobile devices in daily life. For example, online video streaming include popular services such as YouTube and Hulu. Video recording and video conferencing include services such as Skype and Google Hangout. In 2011, YouTube had more than 1 trillion global views. Ten percent of the views were accessed via mobile phones or tablets. As more smart phones, tablets, and other mobile computing devices are purchased, their use for video recording and video conferencing will increase dramatically. With such high consumer demand for multimedia services coupled with developments in media compression and wireless network infrastructures, it is of interest to enhance the multimedia service capabilities of future cellular and mobile broadband systems and deliver high quality of experience (QoE) to the consumers, thereby ensuring ubiquitous access to video content and services from any location, at any time, with any device and technology.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 3A illustrates a session description protocol (SDP) offer message that indicates a region-of-interest (ROI) zooming capability based on a real-time transport protocol (RTP) header extension technique in accordance with an example;

FIG. 3B illustrates a session description protocol (SDP) answer message that accepts a region-of-interest (ROI) zooming capability based on a real-time transport protocol (RTP) header extension technique in accordance with an example;

FIG. 4A illustrates a session description protocol (SDP) offer message that indicates a region-of-interest (ROI) zooming capability based on a real-time transport control protocol (RTCP) feedback technique in accordance with an example;

FIG. 4B illustrates a session description protocol (SDP) answer message that accepts a region-of-interest (ROI) zooming capability based on a real-time transport control protocol (RTCP) feedback technique in accordance with an example;

Figure 1:
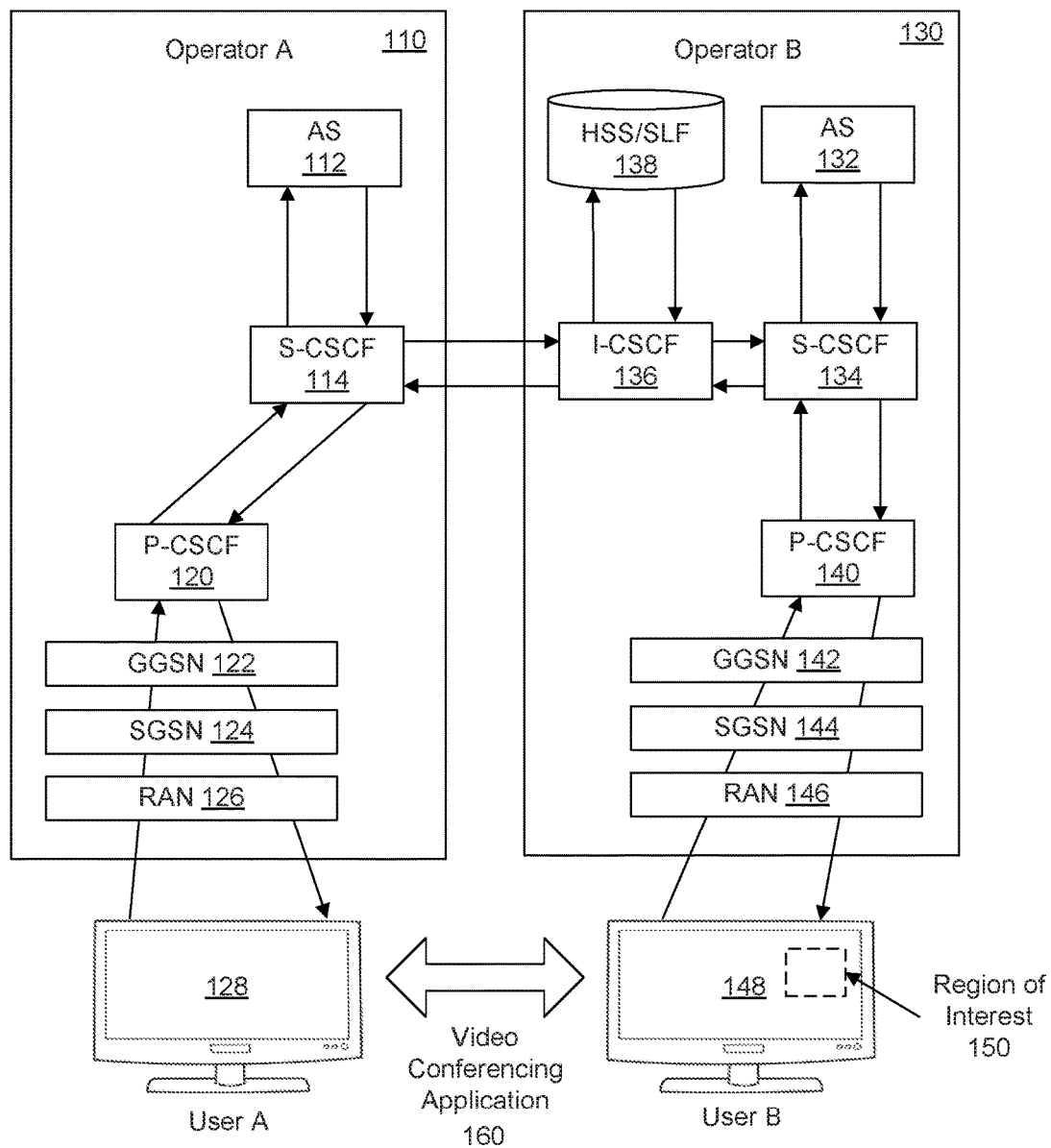
FIG. 1 illustrates a multimedia telephony services over IMS (MTSI)-based video conferencing system that supports a region-of-interest (ROI) zooming feature in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for operating a video conferencing application at a local user equipment (UE) that supports an interactive zooming feature. A local user at the local UE can communicate with a remote user at a remote UE by using the video conferencing application. The local user viewing a scene via the video conferencing application on a display screen of the local UE can select an area within the scene. This area can be referred to as a region of interest (ROI) within a field of view at the remote UE. The local user may select the ROI when the local user desires a more detailed representation of contents within the ROI. The local user can dynamically switch a video feed of the scene to the selected area of the scene (i.e., the ROI) using the interactive zooming feature. The ROI can be communicated from the local UE to the remote UE via a real-time transport control protocol (RTCP) feedback message. Upon receiving the RTCP feedback message, the remote UE can capture video within the ROI. In addition, the remote UE can encode the video within the ROI. The encoded video can include regions within the ROI and exclude regions outside the ROI. The remote UE can transmit the encoded video to the local UE. The encoded video can include the regions within the ROI at an increased zoom level while substantially maintaining a defined quality level. In other words, the remote UE can provide the encoded video within the ROI in order to enable playback of the encoded video at the local UE. By the remote UE transmitting only the selected area of the scene (i.e., the ROI) to the local UE, and excluding the non-selected area of the scene from transmission, the video conferencing application can more efficiently use the available bandwidth.

There have been a number of multimedia standards that have been developed to enable multimedia to be communicated to, from, or between mobile computing devices. For instance, in streaming video, the third generation partnership project (3GPP) has developed technical specification (TS) 26.234 (e.g. Release 11.0.0) that describes packet-switched streaming services (PSS) that are based on the real-time streaming protocol (RTSP) for unicast streaming of on-demand or live content. In addition, hyper-text transfer protocol (HTTP) based streaming services, including progressive download and dynamic adaptive streaming over HTTP (DASH), are described in 3GPP TS 26.247 (e.g. Release 11.0.0). 3GPP-based multimedia broadcast and multicast services (MBMS) specification TS 26.346 (e.g. Release 11.0.0) specifies streaming and download techniques for multicast/broadcast content distribution. As such, DASH/PSS/MBMS-based mobile computing devices, such as user equipment (UEs), decode and render streamed videos at the UE devices. Support for the 3GP file format in 3GPP TS 26.244 (e.g. Release 11.0.0) is mandated in all of these specifications to support file download and HTTP-based streaming use cases.

One example of a standard for conversational video communication, such as video conferencing, is provided in 3GPP TS 26.114 (e.g. 11.0.0). The standard describes the multimedia telephony services over IMS (MTSI) that allows delivery of advanced multimedia conversational services and content over internet protocol (IP) multimedia subsystems (IMS) based networks. IMS is standardized in 3GPP TS 26.140 (e.g. Rel. 11.0.0). The 3GPP TS 26.140 describes media handling and interaction, which includes media control, media codecs, and the transport of media and control data. The 3GPP TS 26.140 also enables video sharing using multimedia sharing services (MMS), in which support for the 3GP file format is provided.

As described in further detail below, a MTSI call can use call session control function (CSCF) mechanisms to reroute control-plane signaling between the UEs involved in the call (e.g., the video conference application). In the control plane, application servers (AS) can be present and provide supplementary services, such as call hold or resume, call forwarding and multi-party calls, etc.

An MTSI-based transmitter UE terminal can capture and record video, and then transfer the video to an MTSI-based receiver UE terminal over a 3GPP network. The receiver UE terminal can then decode and render the video. In MTSI, the session initiation protocol (SIP) can serve as the application-layer control protocol to establish, modify, and terminate conversational multimedia sessions, such as video conferences, Internet telephony calls, and others. Session description protocol (SDP) based signaling between the sending and receiving terminals can allow for offer/answer considerations in the media-related capability negotiation, including codecs, bitrates, resolutions, etc. The transport of media in MTSI is based on the real-time transport protocol (RTP) (specified by IETF RFC 3550) over UDP/IP.

The resolutions of capture devices, and therefore compressed videos, are rapidly increasing. For example, using the recent High Efficiency Video Coding (HEVC) standard, 4K content can be transported and stored as part of an operational product. Cameras having 4k-by-2k resolution are now widely available. Live streaming video has been demonstrated with resolutions of 8k-by-4k. Resolutions, in terms of numbers of pixels, are likely to increase in the future. With these very high resolution contents, new usages in video streaming are now possible, such as interactive zooming features.

Conversational video services that are currently present in the marketplace, such as MTSI, enable dynamic adaptation of video in terms of bandwidth, spatial resolution, orientation, etc. However, these conversational video services do not enable users to dynamically switch to a user-selected area in the video being streamed, and optimize encodings for this user-selected area. As a result, the achievable video resolution during the usage of interactive zoom features in video calls can be limited. Although a receiver application can zoom in to the region-of-interest (ROI) and crop out the unwanted parts of the video (e.g., in response to the commands from a user interface), one limitation of current systems is that the sending terminal would still encode and transmit the entire video frame in the absence of any ROI signaling from the receiving terminal.

FIG. 1 illustrates an exemplary multimedia telephony services over IMS (MTSI)-based video conferencing system that supports a region-of-interest (ROI) zooming feature. A user (e.g., user A) associated with a remote user equipment (UE) 128 (e.g., a mobile phone, a tablet computer, a desktop computer, or other suitable device) can be video conferencing with another user (e.g., user B) associated with a local UE 148. In other words, both the remote UE 128 and the local UE 148 can be running a two-way video conferencing application 160. The user A can be in proximity to the remote UE 128 (e.g., in front of the remote UE 128) and the user B can be in proximity to the local UE 148 (e.g., in front of the local UE 148). Both the remote UE 128 and the local UE 148 can each include a camera that enables the users to view each other while the video conferencing application 160 is running. The remote UE 128 can include a remote camera and the local UE 148 can include a local camera. The remote UE 128 can include a camera that captures video of user A during operation, and a display screen, which displays video of user B to user A during operation. Similarly, the local UE 148 can include a camera that captures video of user B during operation, and a display screen, which displays video of user A to user B during operation. In other words, user A can view user B via the display screen on the remote UE 128, and user B can view user A via the display screen on the local UE 148.

In one example, the video conferencing application 160 can be over an MTSI-based conversational video system. In other words, the video conferencing application 160 can operate over 3GPP-based multimedia telephony services, which connect the remote UE 128 and the local UE 148 to each other and to the telephone network.

The remote UE 128 can connect to the core network through a radio access network (RAN) 126, a serving general packet radio service (GPRS) support node (SGSN) 124, and/or a gateway GPRS support node (GGSN) 122. The remote UE 128 can send and receive data through a proxy call session control function (P-CSCF) 120. The P-CSCF 120 can send and receive data with a serving call session control function (S-CSCF) 114. In some examples, the S-CSCF 114 can send and receive data from an application server (AS) 122, which can provide supplementary services, such as call hold/resume, call forwarding and multi-party calls, etc. In this example, the RAN 126, the SGSN 124, the GGSN 122, the P-CSCF 120, the S-CSCF 114, and the AS 112 can be associated with an operator A 110. The S-CSCF 114 can send and receive data from other parts of the core network. For example, the S-CSCF 114 that is associated with Operator A 110 can communicate with an interrogating CSCF (I-CSCF) 136 that is associated with an operator B 130.

The local UE 148 can connect to the core network through its own radio access network (RAN) 146, serving general packet radio service (GPRS) support node (SGSN) 144, and gateway GPRS support node (GGSN) 142. The local UE 148 can send and receive data through a proxy call session control function (P-CSCF) 140. The P-CSCF 140 can send and receive data with a serving call session control function (S-CSCF) 134. In some examples, the S-CSCF 134 can send and receive data from an application server (AS) 132, which can provide supplementary services, such as call hold/resume, call forwarding and multi-party calls, etc. The S-CSCF 114 and the S-CSCF 134 can each communicate with an interrogating CSCF (I-CSCF) 136. In other words, operator A 110 can communicate with operator B 130 via communications between the S-CSCF 114 and the I-CSCF 136. The I-CSCF 134 can read and write to a home subscriber server (HSS) 138 and/or a subscriber location function (SLF) 138. In this example, the RAN 146, the SGSN 144, the GGSN 142, the P-CSCF 140, the HSS/SLF 138, the I-CSCF 136, the S-CSCF 134, and the AS 132 can be associated with the operator B 130.

In one configuration, the video conferencing application 160 can support a zooming feature. For example, the local UE 148 can zoom into a particular feature or location in the field of view of the remote camera (i.e., the camera associated with the remote UE 128). At the local UE 148, user B can define a region of interest (ROI) 150 within a field of view at the remote UE 128. As a non-limiting example, at the remote UE 128, the user A may view the user B's head on the display screen of the remote UE 128. At the local UE 148, the user B may view the user A's head and torso on the display screen of the local UE 148. The user B may desire an enhanced view of the user A (e.g., the user B may desire to zoom into user A's face). User B can define the ROI 150 at the local UE 150, such that the ROI 150 includes user A's face. The ROI 150 can be defined at the local UE 150 using, for example, a graphical user interface. In other words, the user B may select the region using an input device, such as a computer mouse or a touch screen. The ROI 150 can include other suitable regions within the field of view of the remote camera. For example, the user B can define the ROI 150 to include user A's torso, a tree behind user A, etc. As other examples, the ROI 150 can include a top right region of the display screen of the local UE 148 (which corresponds to an appropriate field of view of the remote camera), a lower left region of the display screen of the local UE 148, etc.

In one example, the ROI 150 can be defined using at least two attributes. One attribute is position, which can specify an upper left corner of the area covered in the original content, or can specify another suitable location. The other attribute is size, which can specify the size of the area covered in the original content in relative values. For instance, a non-limiting example of position can be "0:0", and a non-limiting example of size can be "0.33:0.33".

In one example, the user B can define the ROI 150 to have an arbitrary size and location within the field of view of the remote camera. In another example, the remote UE 128 can remain stationary when the ROI 150 is defined, so that selecting an ROI 150 does not move or change the field of view of the remote camera. In yet another example, the user B can select a new ROI 150 at will. In addition, the user A (at the remote UE 128) can also select an analogous ROI to zoom in on the user B (at the local UE 148).

Once the ROI 110 is defined at the local UE 148, the ROI 110 can be sent from the local UE 148 to the remote UE 128. As discussed in further detail below, the ROI 110 can be communicated using a real-time transport protocol (RTP) message or a real-time transport control protocol (RTCP) feedback message. The RTP message or the RTCP feedback message can direct the remote UE 128 to capture video within the ROI 110.

In some examples, the remote UE 128 can capture video that includes only the ROI 150 and excludes regions outside the ROI 150. As a non-limiting example, the RTP message or the RTCP feedback message (that includes the ROI 110) can instruct the remote UE 128 to capture a wound on the user A's chin. In other words, the remote UE's camera can capture only the wound on the user A's chin, and no other regions that surround the user A's chin.

Upon capturing the video in accordance with the ROI 150, the remote UE 128 can encode the video, for example, using an encoding scheme with relatively low compression. Therefore, the video can provide a relatively close-up and detailed view of the ROI 150, while substantially maintaining a defined level of quality. The remote UE 128 can encode the video (with the ROI 150) with the less lossy encoding scheme because the resources that were previously used to encode the entire field of view are now only used to encode the ROI 150. The remote UE 128 can transmit the encoded video (with only the ROI) to the local UE 148. Since the remote UE 128 may consume substantially the same amount of bandwidth when transmitting the encoded video (with only the ROI 150), as opposed to the full field of view of the remote camera (associated with the remote UE 128), the encoded video can be of substantially high quality. In other words, the encoded video of the ROI can be relatively clear and not grainy or blurry. In this regard, the technique described herein is superior to previous technologies where a user (e.g., the user B) manually zooms into the frame displayed on the display screen, which can lead to a reduced quality level. In the current solution, the remote UE 128 can encode only the ROI 150 with a negotiated resolution rather than the whole captured frame, and this would lead to a higher overall resolution and better user experience at the local UE 148.

As a non-limiting example, the remote UE 128 can encode a video of the wound on the user A's chin. The remote UE 128 can use an encoding scheme with relatively low compression, such that the user A's chin is viewable with a relatively large resolution and clarity level. In other words, the encoded video can be a zoomed in representation of the user A's chin, but still maintains a relatively high quality level (e.g., not grainy). In addition, an entire bandwidth can be used for sending the encoded video of the user A's chin, which can result in a relatively clear and detailed representation of the user A's chin. This representation can provide additional details of the user A's face as opposed to if all of the user A's face was included as part of the encoded video.

In an alternative configuration, the remote UE 128 can capture video that includes the full field of view of the remote camera (associated with the remote UE 128). However, the remote UE 108 can only encode a portion of the video that includes the ROI 150. In addition, the remote UE 108 can transmit the encoded video that includes only the ROI 150 and excludes regions outside the ROI 150.

The local UE 148 can receive the encoded video from the remote UE 128, where the encoded video includes regions within the ROI 150 and excludes regions outside the ROI 150. The local UE 148 can render and display the encoded video on the display screen associated with the local UE 148. As a non-limiting example, the user B sitting in front of the local UE 148 can view a detailed and close-up representation of the wound on the user A's chin. The user B can always revert back to a previous view of the user A, e.g., the user B can un-zoom and revert back to viewing the user A's entire face and torso on the display screen of the local UE 148.

As described herein, novel media handling and session management features are targeted for conversational video services. These novel features may provide an enhanced resolution for an interactive zoom feature in a video conferencing application. Information on the user's ROI can be signaled from the receiving terminal to the sending terminal, e.g., as part of the RTCP feedback signaling or RTP header extension. As a result, this enhanced zooming feature can provide improved image quality for the selected region, as compared to a simple graphical zoom, since the sending device can use all of the available bandwidth for encoding and transmitting the ROI. Since the sending device can use all of the available bandwidth for this limited purpose, video with higher bitrates and quality can be delivered to the receiving terminal.

Figure 2:
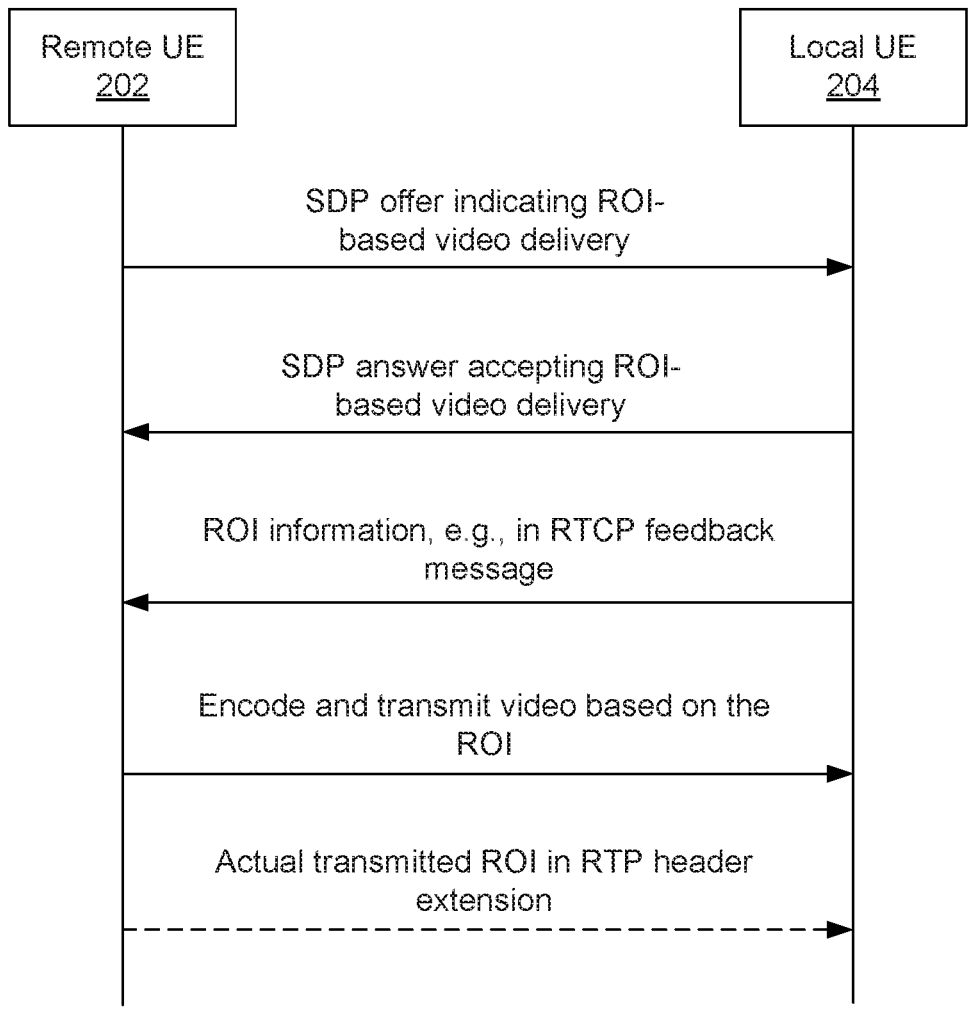
FIG. 2 is a flow diagram illustrating communications between a remote user equipment (UE) and a local UE for initiating a region-of-interest (ROI) zooming feature in a multimedia telephony services over IMS (MTSI)-based video conferencing application in accordance with an example.

FIG. 2 is an exemplary flow diagram illustrating communications between a remote user equipment (UE) 202 and a local UE 204 for initiating a region-of-interest (ROI) zooming feature in a multimedia telephony services over IMS (MTSI)-based video conferencing application. In one example, the remote UE 202 can be referred to as a sending client and the local UE 204 can be referred to as a receiving client. The remote UE 202 and the local UE 204 can each run a video conferencing application that allows a remote user associated with the remote UE 202 to communicate with a local user associated with the local UE 204. Session description protocol (SDP)-based signaling between the remote UE 202 and the local UE 204 can allow for offer/answer considerations in the media-related capability negotiation for the ROI zooming feature. The ROI zooming feature can result in enhanced video resolutions at the remote UE 202 and/or the local UE 204.

The remote UE 202 can send an SDP offer message to the local UE 204. The SDP offer message can indicate that the remote UE 202 supports ROI-based video delivery. In other words, the SDP offer message can indicate a ROI-based streaming capability at the remote UE 202. The remote UE 202 can be configured to support ROI-based video capturing, ROI-based video encoding and ROI-based video transmissions. The local UE 204 can receive the SDP offer message from the remote UE 202, and in response, send an SDP answer message that accepts the ROI-based video delivery capability.

In one configuration, the local UE 204 can define the ROI and send ROI information to the remote UE 202. As previously explained, the ROI information can define a region of interest (ROI) within a field of view at the remote UE 202. The ROI can be defined using at least two attributes. One attribute is position, which can specify an upper left corner of the area covered in the original content, or can specify another suitable location. The other attribute is size, which can specify the size of the area covered in the original content in relative values. In one example, the ROI information can be communicated from the local UE 204 to the remote UE 202 using a real-time transport control protocol (RTCP) feedback message. In an alternative example, the ROI information can be communicated from the local UE 204 to the remote UE 202 using a real-time transport protocol (RTP) header extension message. In particular, the local UE 204 can communicate the ROI information to the remote UE 202 using the RTP header extension message for reverse-direction video streams.

The remote UE 202 can receive the ROI information and capture video that includes only the ROI and excludes regions outside the ROI. The remote UE 202 can encode the video that includes only the ROI. The remote UE 202 can send the encoded video to the local UE 204. In one example, the remote UE 202 can also indicate an actual transmitted ROI in an RTP header extension message for forward-direction video streams. The local UE 204 can receive the encoded video that includes the ROI and play the video at the local UE 204.

When the ROI information is signaled from the local UE 204 to the remote UE 202 using the RTP header extension message, an MTSI client that supports the ROI zooming feature can offer ROI zooming in SDP messages for all media streams containing video. The ROI zooming feature can be offered by including the a=extmap attribute indicating the ROI-Zoom uniform resource name (URN) under the relevant media line scope. For instance, the ROI-Zoom URN can be set as: urn:3gpp:roi-zoom. An example of a media line that includes this URN is: a=extmap:7 urn:3gpp:roi-zoom. In the above example of a media line, the number 7 can be replaced with any number in the range of 1 and 14.

When the ROI information is signaled from the local UE 204 to the remote UE 202 using the RTCP message, an MTSI client that supports the ROI zooming feature can offer ROI zooming in SDP messages for all media streams containing video. The ROI zooming feature can be offered by including the a=rtcp-fb attribute with a novel ROI-Zoom type under the relevant media line scope. For instance, the ROI-Zoom type in conjunction with the RTCP feedback technique can be expressed with the following parameter: 3gpp:roi-zoom. A wildcard payload type ("*") can be used to indicate that the RTCP feedback attribute for ROI signaling applies to all payload types. If several types of ROI feedback are supported and/or the same ROI feedback shall be specified for a subset of the payload types, then several "a=rtcp-fb" lines can be used. An example usage of this attribute to signal the ROI zoom feature relative to a media line based on the RTCP feedback technique is: a=rtcp-fb: *3gpp-roi-zoom.

The RTCP feedback technique can involve signaling of ROI information in both of the immediate feedback and early RTCP modes. The novel RTCP feedback type for ROI-Zoom can include: a value name of 3gpp-roi-zoom, a long name of Region-of-interest (ROI) information, and a reference of 3GPP TS 26.114. In the Augmented Backus-Naur Form (ABNF) for the value of rtcp-fb-val, as defined in Internet Engineering Task Force (IETF) request for comments (RFC) 4585, there is a placeholder called rtcp-fb-id to define new feedback types. "3gpp-roi-zoom" is defined as a new feedback type for ROI information signaling, and the ABNF can be given as follows: rtcp-fb-val=/"3gpp-roi-zoom".

The ROI-Zoom capability can be supported bi-directionally or uni-directionally depending on how clients negotiate to support the feature during SDP capability negotiations. For terminals with asymmetric capability (e.g. the ability to process ROI information but not detect/signal ROI information), the "sendonly" and "recvonly" attributes can be used. Terminals are to express their capability in each direction sufficiently clearly, such that signals are only sent in each direction to the extent that they both express useful information and can be processed by the recipient.

The ROI zooming feature includes signaling of the current ROI of the receiving user to the sender so that the sending UE can optimally encode and transmit the captured video. When ROI-Zoom is successfully negotiated, it can be signaled by the MTSI client. The signaling of the ROI-Zoom can use RTCP feedback reporting or RTP Header Extensions.

When using RTCP feedback reports, the receiving terminal includes the current ROI information of the user in the RTCP reports it is transmitting to the sending terminal. When using RTP header extensions, the receiving terminal includes the current ROI information of the user in the RTP packets it is transmitting to the sending terminal. These RTP packets carry video streams in the reverse direction, which can be used for bi-directional video communications in MTSI.

These different ROI signaling capabilities can be indicated in the SDP offer via different uniform resource names (URNs). In some examples, one can pick one of these and use a single URN in the SDP capability negotiations. Since RTCP is not always used in video calls and can be turned off (this is also part of the SDP negotiation), it can be safest to deliver the ROI information as part of the RTP header extensions of the reverse-direction video streams for broadest support of the ROI-Zoom feature. However, if the reverse link is not actively sending RTP streams, then the RTCP feedback technique is a preferred.

The presence of ROI-Zoom should not impact the negotiated resolutions (based on SDP imageattr attribute) between the sending and receiving terminals. The only difference is that the sending terminal would encode only the ROI with the negotiated resolution rather than the whole captured frame, and this would lead to a higher overall resolution and better user experience than having the receiving terminal zoom in on the ROI and crop out the rest of the frame. The sending terminal can potentially indicate ROI as part of the RTP header extension in RTP packets for its forward-direction video streams.

FIG. 3A illustrates an exemplary session description protocol (SDP) offer message. The SDP offer message can be communicated between a remote user equipment (UE) and a local UE. The SDP offer message can be based on a real-time transport protocol (RTP) header extension technique. The SDP offer message can indicate a region-of-interest (ROI) zooming capability. As an example, the SDP offer message can include an attribute of "a=extmap" and an associated value of "4 urn:3gpp:roi-actual". As another example, the SDP offer message can include an attribute of "a=rtcp-fb" and an associated value of "3gpp-roi-zoom".

FIG. 3B illustrates an exemplary session description protocol (SDP) answer message. The SDP answer message can be communicated between a remote user equipment (UE) and a local UE. The SDP answer message can be based on a real-time transport protocol (RTP) header extension technique. The SDP answer message can accept a region-of-interest (ROI) zooming capability. As an example, the SDP answer message can include an attribute of "a=extmap" and an associated value of "4 urn:3gpp:roi-actual". As another example, the SDP answer message can include an attribute of "a=rtcp-fb" and an associated value of "3gpp-roi-zoom".

FIG. 4A illustrates an exemplary session description protocol (SDP) offer message. The SDP offer message can be communicated between a remote user equipment (UE) and a local UE. The SDP offer message can be based on a real-time transport control protocol (RTCP) feedback technique. The SDP offer message can indicate a region-of-interest (ROI) zooming capability. As an example, the SDP offer message can include an attribute of "a=rtcp-fb" and an associated value of "3gpp:roi-zoom". As another example, the SDP offer message can include an attribute of "a=extmap" and an associated value of "4 urn:3gpp:roi-actual".

FIG. 4B illustrates an exemplary session description protocol (SDP) answer message. The SDP answer message can be communicated between a remote user equipment (UE) and a local UE. The SDP answer message can be based on a real-time transport control protocol (RTCP) feedback technique. The SDP answer message can accept a region-of-interest (ROI) zooming capability. As an example, the SDP answer message can include an attribute of "a=rtcp-fb" and an associated value of "3gpp:roi-zoom".

Figure 5:
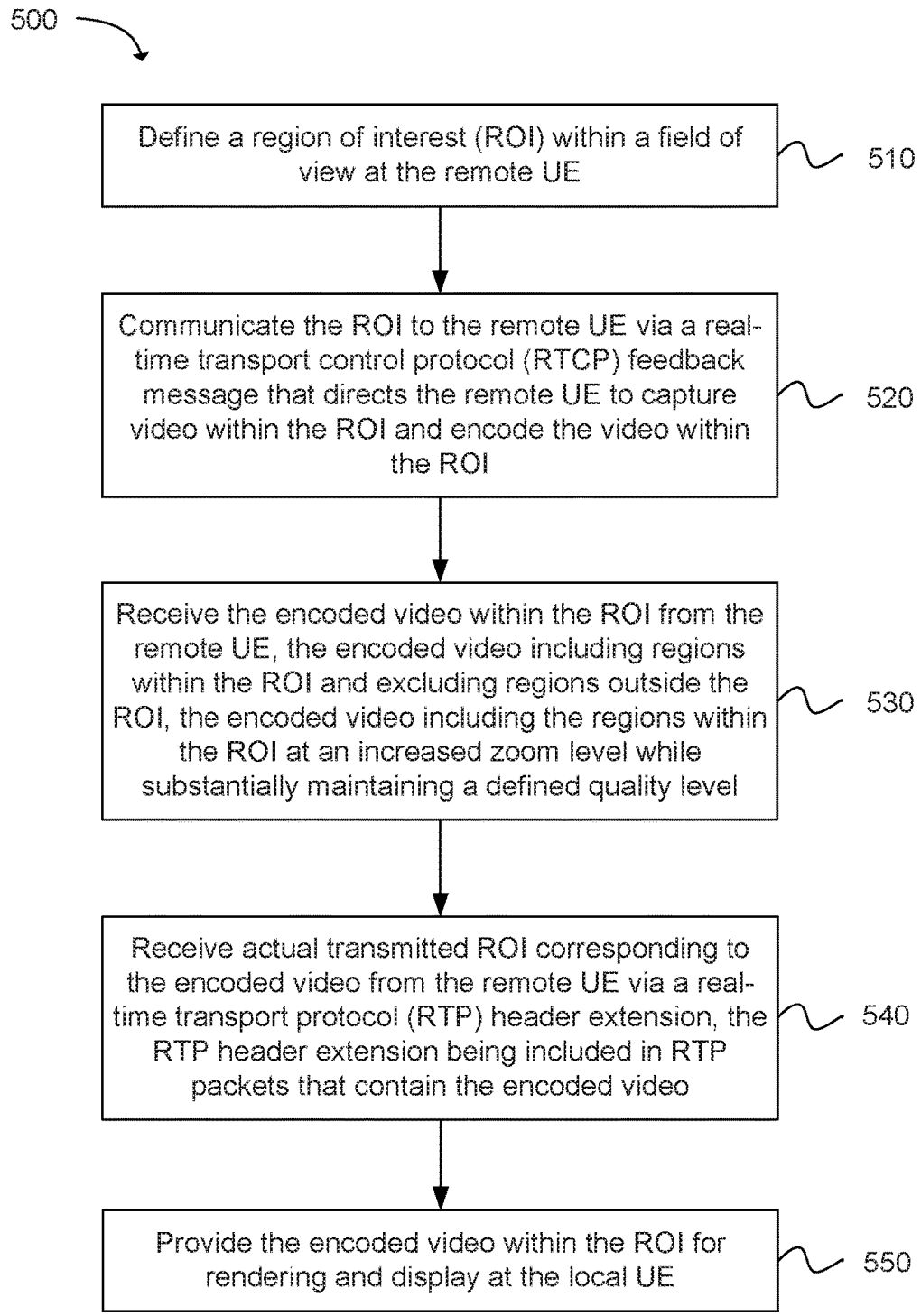
FIG. 5 depicts functionality of circuitry of a local user equipment (UE) operable to perform video conferencing with a remote UE in accordance with an example.

Another example provides functionality 500 of a local user equipment (UE) operable to perform video conferencing with a remote UE, as shown in the flow chart in FIG. 5. The functionality can be implemented as a method or the functionality can be executed as instructions on a machine, where the instructions are included on at least one computer readable medium or one non-transitory machine readable storage medium. The local UE can have one or more processors configured to define a region of interest (ROI) within a field of view at the remote UE, as in block 510. The local UE can have one or more processors configured to communicate the ROI to the remote UE via a real-time transport control protocol (RTCP) feedback message that directs the remote UE to capture video within the ROI and encode the video within the ROI, as in block 520. The local UE can have one or more processors configured to receive the encoded video within the ROI from the remote UE, the encoded video including regions within the ROI and excluding regions outside the ROI, the encoded video including the regions within the ROI at an increased zoom level while substantially maintaining a defined quality level, as in block 530. The local UE can have one or more processors configured to receive actual transmitted ROI corresponding to the encoded video from the remote UE via a real-time transport protocol (RTP) header extension, the RTP header extension being included in RTP packets that contain the encoded video, as in block 540. The local UE can have one or more processors configured to provide the encoded video within the ROI for rendering and display at the local UE, as in block 550.

In one example, the one or more processors can be further configured to receive a session description protocol (SDP) offer message from the remote UE indicating that the remote UE supports ROI-based video capturing, ROI-based video encoding and ROI-based video transmissions. In another example, the one or more processors can be further configured to send a session description protocol (SDP) answer message acknowledging that the local UE supports ROI signaling via RTCP feedback messages, ROI-based video decoding and ROI-based video reception.

In one example, the SDP offer message includes an attribute of a=rtcp-fb that is associated with a parameter 3gpp-roi-zoom, thereby indicating that the remote UE supports ROI-based video capturing, ROI-based video encoding and ROI-based video transmissions, wherein the remote UE is configured to process the RTCP feedback messages received from the local UE in order to obtain ROI information. In another example, the SDP answer message includes an attribute of a=rtcp-fb that is associated with a parameter 3gpp-roi-zoom, thereby indicating that the local UE supports ROI signaling via RTCP feedback messages, ROI-based video decoding and ROI-based video reception, wherein the local UE is configured to generate RTCP feedback messages and send the RTCP feedback messages to the remote UE in order to deliver ROI information.

In one example, the SDP offer message includes an attribute a=extmap that is associated with a parameter urn: 3gpp-roi-actual, thereby indicating that the remote UE supports ROI-based video capturing, ROI-based video encoding and ROI-based video transmissions, wherein the remote UE is configured to signal the actual transmitted ROI corresponding to the encoded video in an RTP header extension received at the local UE. In another example, the SDP answer message includes an attribute a=extmap that is associated with a parameter urn:3gpp-roi-actual, thereby indicating that the local UE supports ROI signaling via RTCP feedback messages, ROI-based video decoding and ROI-based video reception, wherein the local UE is configured to receive the actual transmitted ROI corresponding to the encoded video in an RTP header extension from the remote UE.

In one example, the RTCP feedback message includes a position and a size that define the ROI within the field of view at the remote UE. In another example, the one or more processors can be further configured to communicate the ROI to the remote UE via the RTCP feedback message, wherein the remote UE captures video within the ROI and only encodes the video within the ROI. In yet another example, the one or more processors are further configured to operate a video conferencing application with the remote UE that supports a ROI-based interactive zooming feature. In one configuration, the RTCP feedback message includes an indication of one or more predefined ROIs within the field of view at the remote UE. In another configuration, the RTP header extension includes a position and a size that define the actual transmitted ROI corresponding to the encoded video received from the remote UE.

Figure 6:
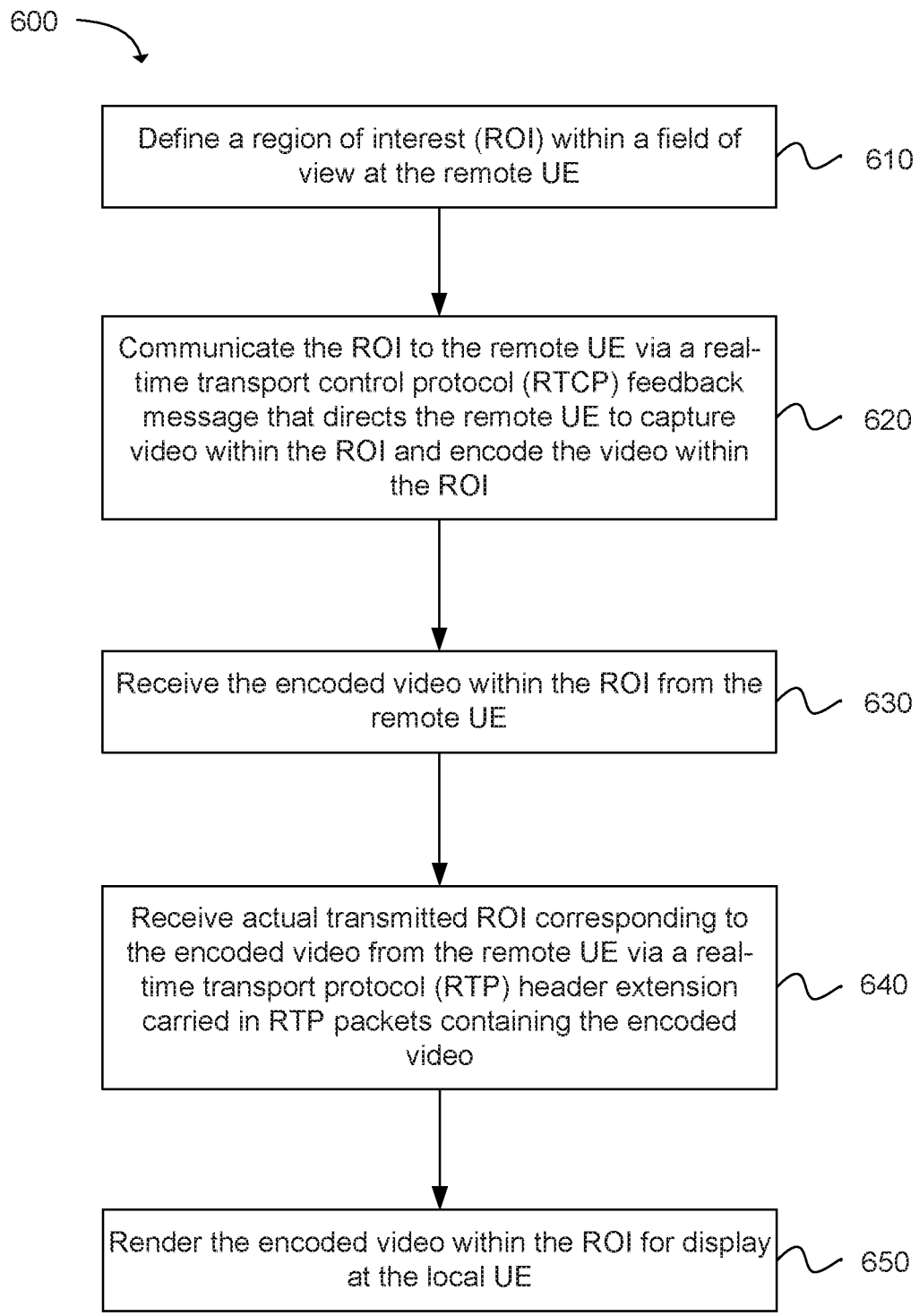
FIG. 6 depicts functionality of circuitry of a local user equipment (UE) operable to perform video conferencing with a remote UE in accordance with an example.

Another example provides functionality 600 of a local user equipment (UE) operable to perform video conferencing with a remote UE, as shown in the flow chart in FIG. 6. The functionality can be implemented as a method or the functionality can be executed as instructions on a machine, where the instructions are included on at least one computer readable medium or one non-transitory machine readable storage medium. The local UE can have one or more processors configured to define a region of interest (ROI) within a field of view at the remote UE, as in block 610. The local UE can have one or more processors configured to communicate the ROI to the remote UE via a real-time transport control protocol (RTCP) feedback message that directs the remote UE to capture video within the ROI and encode the video within the ROI, as in block 620. The local UE can have one or more processors configured to receive the encoded video within the ROI from the remote UE, as in block 630. The local UE can have one or more processors configured to receive actual transmitted ROI corresponding to the encoded video from the remote UE via a real-time transport protocol (RTP) header extension carried in RTP packets containing the encoded video, as in block 640. The local UE can have one or more processors configured to render the encoded video within the ROI for display at the local UE, as in block 650.

In one example, the RTCP feedback message that is communicated to the remote UE includes a position and a size that define the ROI, the position and the size defining the ROI, wherein the position comprises two position values indicative of a corner position of the ROI within the field of view at the remote UE, wherein the two position values are normalized to indicate relative position in two dimensions, wherein the size comprises two size values indicative of a size of the ROI within the field of view at the remote UE, wherein the two size values are normalized to indicate relative size in two dimensions. In another example, the RTCP feedback message includes an indication of one or more predefined ROIs within the field of view at the remote UE.

In one example, the ROI includes a variable number of pixels; and the encoded video received from the remote UE has a variable refresh rate that is inversely proportional to the number of pixels in the ROI. In another example, the ROI includes a fixed number of pixels; and the encoded video received from the remote UE has a constant refresh rate. In yet another example, the RTP header extension that is communicated to the local UE includes a position and a size that define the actual transmitted ROI corresponding to the encoded video received from the remote UE, the position and the size defining the ROI, wherein the position comprises two position values indicative of a corner position of the ROI within the field of view at the remote UE, wherein the two position values are normalized to indicate relative position in two dimensions, wherein the size comprises two size values indicative of a size of the ROI within the field of view at the remote UE, wherein the two size values are normalized to indicate relative size in two dimensions.

Figure 7:
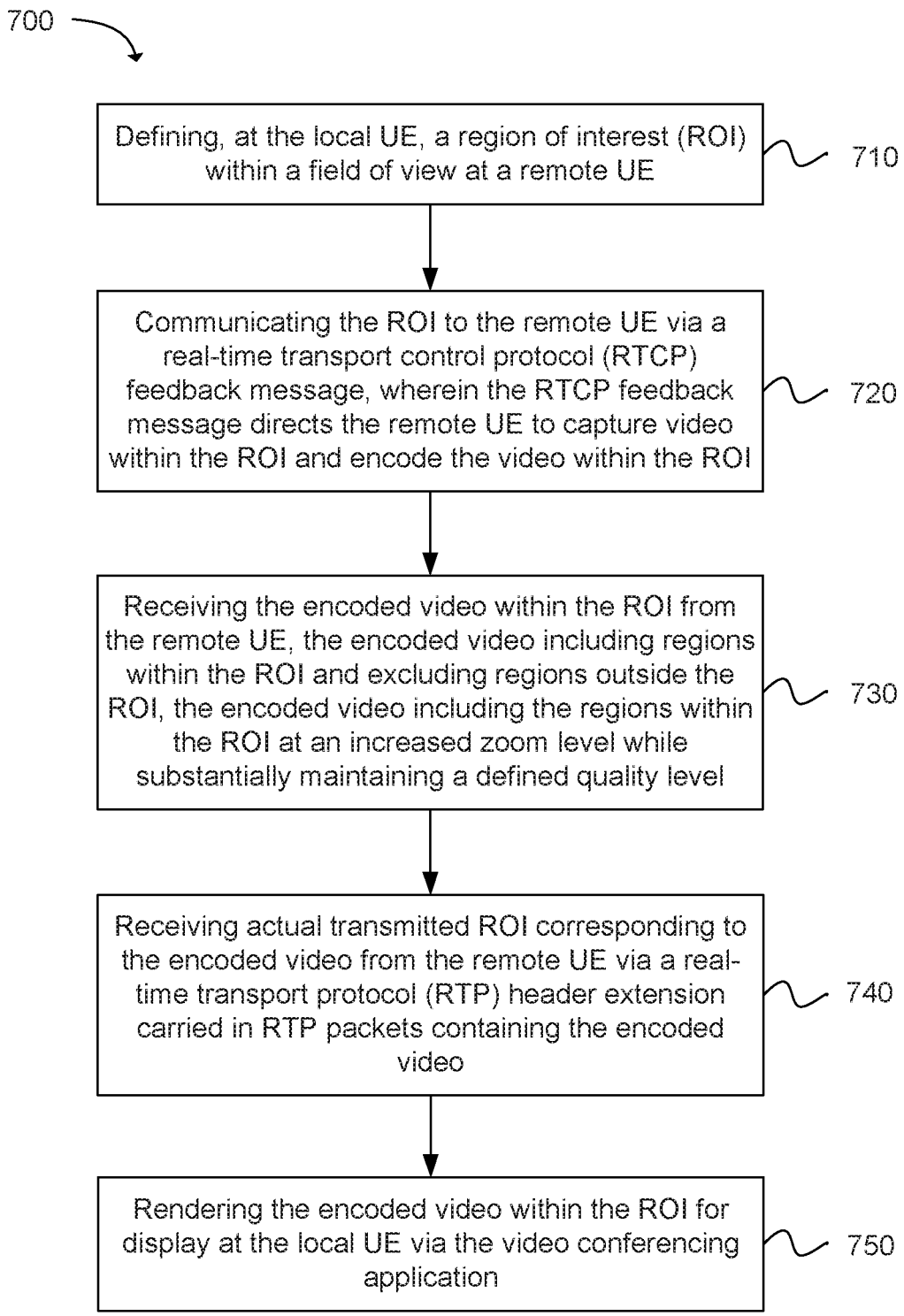
FIG. 7 depicts a flow chart of a method for operating a video conferencing application at a local user equipment (UE) that supports an interactive zooming feature in accordance with an example.

Another example provides a method 700 for operating a video conferencing application at a local user equipment (UE) that supports an interactive zooming feature, as shown in the flow chart in FIG. 7. The method can be executed as instructions on a machine, where the instructions are included on at least one computer readable medium or one non-transitory machine readable storage medium. The method can include the operation of defining, at the local UE, a region of interest (ROI) within a field of view at a remote UE, using one or more processors of the local UE, as in block 710. The method can include the operation of communicating the ROI to the remote UE via a real-time transport control protocol (RTCP) feedback message, wherein the RTCP feedback message directs the remote UE to capture video within the ROI and encode the video within the ROI, using the one or more processors of the local UE, as in block 720. The method can include the operation of receiving the encoded video within the ROI from the remote UE, the encoded video including regions within the ROI and excluding regions outside the ROI, the encoded video including the regions within the ROI at an increased zoom level while substantially maintaining a defined quality level, using the one or more processors of the local UE, as in block 730. The method can include the operation of receiving actual transmitted ROI corresponding to the encoded video from the remote UE via a real-time transport protocol (RTP) header extension carried in RTP packets containing the encoded video, using the one or more processors of the local UE, as in block 740. The method can include the operation of rendering the encoded video within the ROI for display at the local UE via the video conferencing application, using the one or more processors of the local UE, as in block 750.

In one example, the method can further include the operation of receiving a session description protocol (SDP) offer message from the remote UE indicating that the remote UE supports ROI-based video capturing, ROI-based video encoding and ROI-based video transmissions, wherein the SDP offer message includes an attribute of a=rtcp-fb that is associated with a parameter 3gpp-roi-zoom, wherein the remote UE is configured to process the RTCP feedback message received from the local UE in order to obtain ROI information.

In one configuration, the method can further include the operation of sending a session description protocol (SDP) answer message acknowledging that the local UE supports ROI signaling via RTCP feedback messages, ROI-based video decoding and ROI-based video reception, wherein the SDP answer message includes an attribute of a=rtcp-fb that is associated with a parameter 3gpp-roi-zoom, wherein the local UE is configured to generate the RTCP feedback messages and send the RTCP feedback messages to the remote UE in order to deliver ROI information.

In one example, the SDP offer message includes an attribute a=extmap that is associated with a parameter urn: 3gpp-roi-actual, thereby indicating that the remote UE supports ROI-based video capturing, ROI-based video encoding and ROI-based video transmissions, wherein the remote UE is configured to signal the actual transmitted ROI corresponding to the encoded video in an RTP header extension received at the local UE; and the SDP answer message includes an attribute a=extmap that is associated with a parameter urn:3gpp-roi-actual, thereby indicating that the local UE supports ROI signaling via RTCP feedback messages, ROI-based video decoding and ROI-based video reception, wherein the local UE is configured to receive the actual transmitted ROI corresponding to the encoded video in an RTP header extension from the remote UE.

In one example, the RTCP feedback message includes an indication of one or more pre-defined ROIs within the field of view at the remote UE; and the RTCP feedback message includes a position and a size that define the ROI within the field of view at the remote UE. In another example, the position comprises two position values indicative of a corner position of the ROI within the field of view at the remote UE, wherein the two position values are normalized to indicate relative position in two dimensions; and the size comprises two size values indicative of a size of the ROI within the field of view at the remote UE, wherein the two size values are normalized to indicate relative size in two dimensions.

In one configuration, the RTP header extension includes a position and a size that define the actual transmitted ROI corresponding to the encoded video received from the remote UE; the position comprises two position values indicative of a corner position of the ROI within the field of view at the remote UE, wherein the two position values are normalized to indicate relative position in two dimensions; and the size comprises two size values indicative of a size of the ROI within the field of view at the remote UE, wherein the two size values are normalized to indicate relative size in two dimensions.

Figure 8:
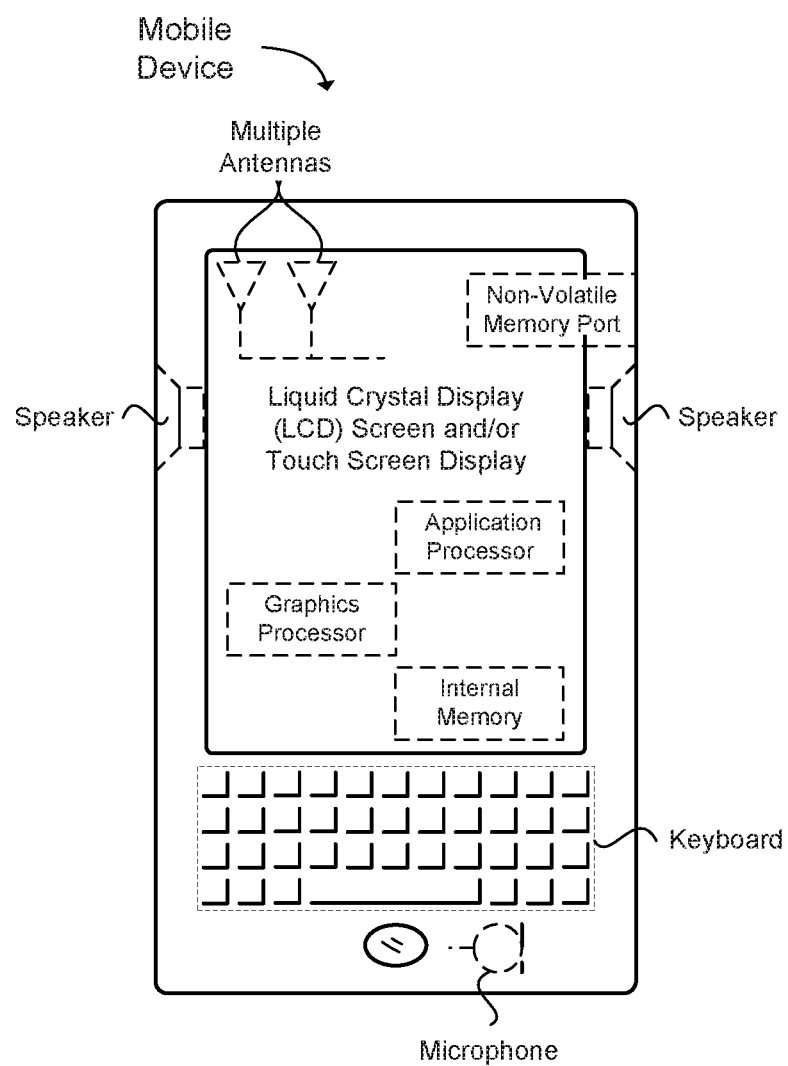
FIG. 8 illustrates a diagram of a wireless device (e.g., UE) in accordance with an example.

FIG. 8 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 8 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The node and wireless device can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits can be used to implement the functional units described in this specification. For example, a first hardware circuit can be used to perform processing operations and a second hardware circuit (e.g., a transceiver) can be used to communicate with other entities. The first hardware circuit and the second hardware circuit can be integrated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. At least one non-transitory machine readable storage medium having instructions embodied thereon for supporting region of interest (ROI) signaling between a multimedia telephony services over internet protocol (IP) multimedia subsystems (IMS) (MTSI) receiver and a MTSI sender, the instructions when executed perform the following:
    identifying, at the MTSI receiver, a requested region of interest (ROI);
    encoding, at the MTSI receiver, the requested ROI for transmission to the MTSI sender via a real-time transport control protocol (RTCP) feedback message; and
    decoding, at the MTSI receiver, encoded video received from the MTSI sender that corresponds to the requested ROI.

2. The at least one non-transitory machine readable storage medium of claim 1, further comprising instructions when executed perform the following: decoding a sent ROI that corresponds to the encoded video received from the MTSI sender, wherein the sent ROI is received from the MTSI sender via a real-time transport protocol (RTP) header extension.

3. The at least one non-transitory machine readable storage medium of claim 1, further comprising instructions when executed perform the following: decoding a session description protocol (SDP) offer message received from the MTSI sender, wherein the SDP offer message indicates that the MTSI sender supports an ROI feature.

4. The at least one non-transitory machine readable storage medium of claim 1, further comprising instructions when executed perform the following: encoding a session description protocol (SDP) answer message for transmission to the MTSI sender, wherein the SDP answer message acknowledges that the MTSI sender supports an ROI feature.

5. The at least one non-transitory machine readable storage medium of claim 1, wherein the SDP offer message includes:
    an RTCP feedback (FB) attribute to signal the requested ROI; or
    an extension map attribute to signal the requested ROI.

6. The at least one non-transitory machine readable storage medium of claim 1, wherein the SDP answer message includes:
    an RTCP feedback (FB) attribute to signal the requested ROI; or an extension map attribute to signal the requested ROI.

7. The at least one non-transitory machine readable storage medium of claim 1, wherein the RTCP feedback message includes a position and a size that define the ROI.

8. The at least one non-transitory machine readable storage medium of claim 2, wherein the RTP header extension includes a position and a size that defines the sent ROI corresponding to the encoded video received from the MTSI sender.

9. At least one non-transitory machine readable storage medium having instructions embodied thereon for supporting region of interest (ROI) signaling between a multimedia telephony services over internet protocol (IP) multimedia subsystems (IMS) (MTSI) sender and a MTSI receiver, the instructions when executed perform the following:
 decoding, at the MTSI sender, a region of interest (ROI) received from the MTSI receiver, wherein the ROI is received via a real-time transport control protocol (RTCP) feedback message
 generating, at the MTSI sender, encoded video that corresponds to the ROI received from the MTSI receiver via the RTCP feedback message; and
 processing, at the MTSI sender, the encoded video for transmission to the MTSI receiver.

10. The at least one non-transitory machine readable storage medium of claim 9, further comprising instructions when executed perform the following: encoding an actual ROI for transmission to the MTSI receiver, wherein the actual ROI corresponds to the encoded video, wherein the actual ROI is transmitted via a real-time transport protocol (RTP) header extension.

11. The at least one non-transitory machine readable storage medium of claim 9, further comprising instructions when executed perform the following: encoding a session description protocol (SDP) offer message for transmission to the MTSI receiver, wherein the SDP offer message indicates that the MTSI sender supports an ROI feature.

12. The at least one non-transitory machine readable storage medium of claim 9, further comprising instructions when executed perform the following: decoding a session description protocol (SDP) answer message received from the MTSI receiver, wherein the SDP answer message acknowledges support of an ROI feature at the MTSI sender.

13. The at least one non-transitory machine readable storage medium of claim 9, wherein the RTCP feedback message includes a position and a size that define the ROI.

14. An apparatus of a first multimedia telephony services over internet protocol (IP) multimedia subsystems (IMS) (MTSI) client operable to support region of interest (ROI) signaling with a second MTSI client, the apparatus comprising:
 memory; and
 one or more processors configured to:
  identify, at the first MTSI client, a requested region of interest (ROI);
  encode, at the first MTSI client, the requested ROI for transmission to the second MTSI client via a real-time transport control protocol (RTCP) feedback message; and
  decoding, at the first MTSI client, encoded video received from the second MTSI client that corresponds to the requested ROI.

15. The apparatus of claim 14, wherein the one or more processors are further configured to decode a sent ROI that corresponds to the encoded video received from the second MTSI client, wherein the sent ROI is received from the second MTSI client via a real-time transport protocol (RTP) header extension.

16. The apparatus of claim 14, wherein the one or more processors are further configured to decode a session description protocol (SDP) offer message received from the second MTSI client, wherein the SDP offer message indicates that the second MTSI client supports an ROI feature.

17. The apparatus of claim 14, wherein the one or more processors are further configured to encode a session description protocol (SDP) answer message for transmission from the first MTSI client to the second MTSI client, wherein the SDP answer message acknowledges that the second MTSI client supports an ROI feature.

18. The apparatus of claim 14, wherein the SDP offer message includes:
 an RTCP feedback (FB) attribute to signal the requested ROI; or
 an extension map attribute to signal the requested ROI.

19. The apparatus of claim 14, wherein the SDP answer message includes:
 an RTCP feedback (FB) attribute to signal the requested ROI; or
 an extension map attribute to signal the requested ROI.

20. The apparatus of claim 14, wherein the RTCP feedback message includes a position and a size that define the ROI.

21. The apparatus of claim 15, wherein the RTP header extension includes a position and a size that defines the sent ROI corresponding to the encoded video received from the second MTSI client.

* * * * *